May 10, 1932.  C. MILLER  1,857,469
MANUFACTURE OF CARBON BLACK
Filed March 12, 1931
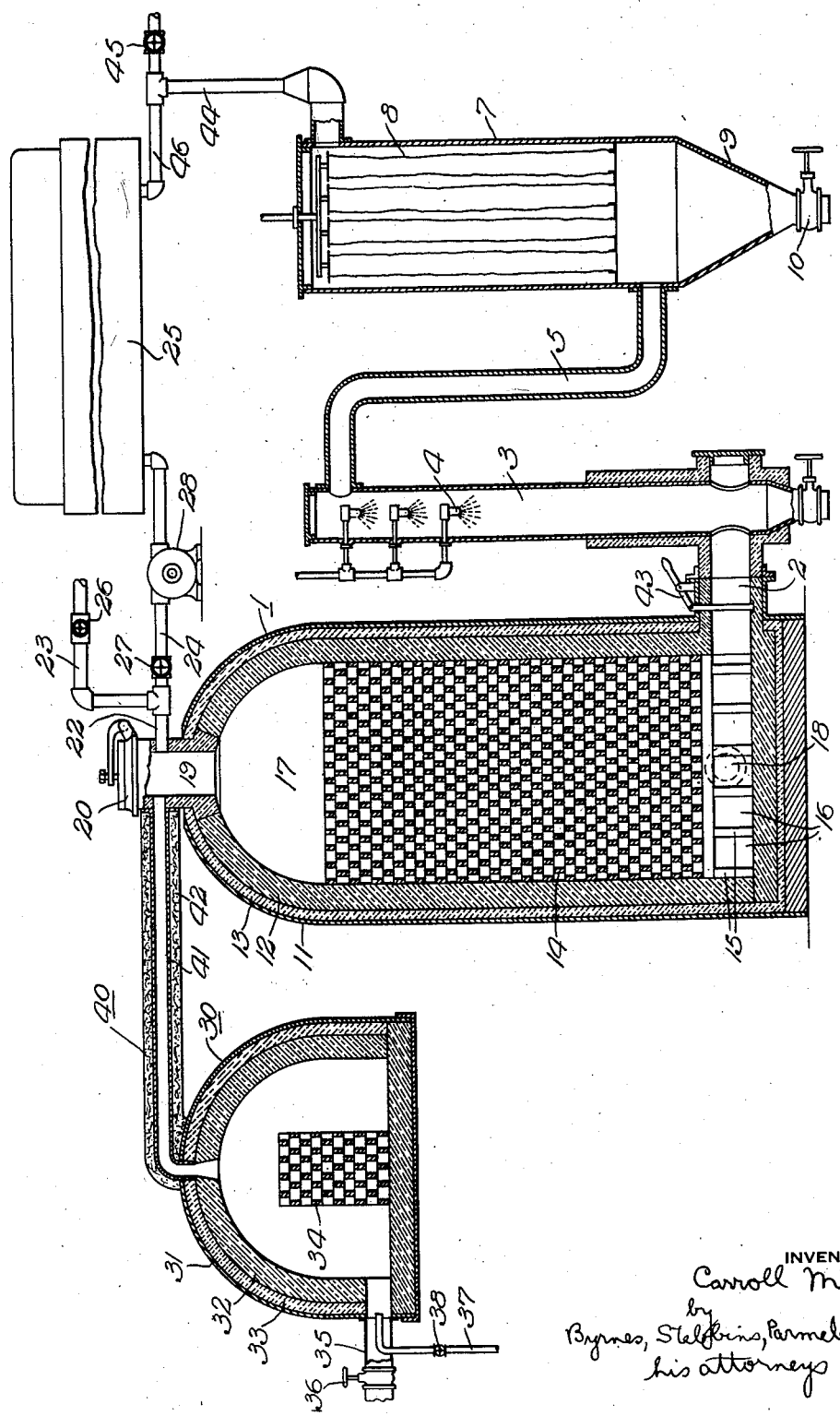
INVENTOR
Carroll Miller
by
Byrnes, Stebbins, Parmelee & Blenko
his attorneys Patented May 10, 1932

1,857,469

UNITED STATES PATENT OFFICE

CARROLL MILLER, OF PITTSBURGH, PENNSYLVANIA, ASSIGNOR TO THERMATOMIC CARBON COMPANY, OF PITTSBURGH, PENNSYLVANIA, A CORPORATION OF DELAWARE

MANUFACTURE OF CARBON BLACK

Application filed March 12, 1931. Serial No. 521,926.

The present invention relates to the manufacture of carbon black, and more especially to an improved process for the manufacture of carbon black in which the hydrocarbon gas being decomposed is diluted with a mixture of inert diluent gases made up by mixing with hot gases of combustion furnished by a burning fuel, a portion or all of the residual gas resulting from the previous decomposition of a quantity of hydrocarbon gas. The present invention is an improvement over the process developed by Ellwood B. Spear and described in the Spear application Serial No. 384,650, filed August 9, 1929.

According to the preferred procedure in the Spear process, the hydrocarbon gas to be decomposed is diluted with hot gases of combustion furnished by a burning fuel. The mixture of the hot gases of combustion and the hydrocarbon gas is passed over extensive hot contact surfaces to decompose the hydrocarbon gas and yield solid carbon particles. Part of the carbon thus formed is deposited upon the hot contact surfaces and part is entrained in and swept along with the gas, which is then passed through devices for quickly cooling it and separating the carbon from the gas.

In the Spear and Moore application Ser. No. 300,131, filed August 16, 1928, is described another process of thermal decomposition of a hydrocarbon gas to produce carbon black in accordance with which a substantially inert diluent gas, preferably the residual gas resulting from the previous decomposition of a quantity of hydrocarbon gas and consisting principally of hydrogen, is preheated above the decomposition temperature of the hydrocarbon gas. The hydrocarbon gas to be decomposed is then mixed with the diluent gas; and the mixture is passed over extensive hot contact surfaces to decompose the hydrocarbon gas and yield solid carbon particles.

My improved process as hereinafter more fully described combines advantageous features of both the Spear and the Spear and Moore processes.

As described in the Spear and Moore application Serial No. 300,131, filed August 16, 1928, the carbon produced in accordance with the process described in the said application has certain of the desirable qualities of both the common commercial carbon blacks and the Brownlee and Uhlinger carbon black. Generally speaking, the Spear and Moore carbon black has the low rubber stiffening qualities of the Brownlee and Uhlinger carbon black but has a darker color. It imparts an ultimate tensile strength to cured rubber compositions approximately equal to that imparted by an equal weight of the best grades of common commercial carbon black. It imparts to the cured rubber a greater elongation at the point of rupture than that imparted by equal weights of either common commercial carbon black or the Brownlee and Uhlinger carbon black.

The process, as described in the Spear application Serial No. 384,650, filed August 9, 1929, has, among other advantages, the use of a cheaper diluent gas, and the advantage in operation that the products of combustion supply heat to the mixture, thereby lengthening the period during which the extensive hot contact surfaces remain at the proper temperature to efficiently decompose the hydrocarbon gas and yield solid carbon particles.

In accordance with my improved process, the hydrocarbon gas being decomposed is diluted with a mixture of inert diluent gases formed by mixing with hot gases of combustion residual gas resulting from the previous decomposition of a quantity of hydrocarbon gas. By using such a mixture, a carbon black is obtained having qualities approaching those of the carbon black produced by the Spear and Moore process described in application Serial No. 300,131, filed August 16, 1928; and at the same time the advantages of cheapness of the gases entering into the mixture which is used to dilute the hydrocarbon gas, and the efficiency in operation due to the heat supplied to the mixture by the products of combustion are retained.

My improved process may be carried out in connection either with the apparatus disclosed in the Spear application Serial No. 384,650, filed August 9, 1929, or in connection with my improved apparatus disclosed in application Serial No. 511,709, filed January 28, 1931.

I will now describe my improved process in connection with the latter type of apparatus. The drawing illustrates the apparatus diagrammatically in central vertical section.

Generally speaking, the apparatus consists of a heating retort which contains refractory checkerwork, this checkerwork being arranged to be heated to a high temperature by a heating blast. Periodically, the heating blast is cut off, and the hydrocarbon gas to be decomposed, usually natural gas, together with diluent gases, are passed through the heated checkerwork, and the hydrocarbon gas is decomposed thereby into hydrogen and solid carbon particles. Part of the carbon particles are deposited on the checkerwork and part are swept along with the gas, which passes out through devices for cooling it and filtering out and recovering the entrained carbon.

Referring to the illustrated embodiment of the apparatus, there is shown a heating retort 1 in which the decomposition of the hydrocarbon gas takes place. The gas, which issues from the retort and which contains the entrained carbon particles, passes through the outlet 2 into a chamber 3 into which the water spray 4 is discharged to cool the gas. The gas is highly heated and converts the water into steam, the latent heat of evaporation serving efficiently to cool the gas. The gas then passes through a conduit 5 into the lower portion of a separating chamber 7, where the gas passes through the fabric bags 8, which are shaken from time to time to dislodge the carbon. The carbon falls into the hopper 9 from which it may be discharged from time to time through a valve 10 into bags, receptacles, or the like. The general lay-out as above described is disclosed and claimed in my co-pending application, Serial No. 511,709, mentioned above. The means for cooling the gas is described in the Brownlee and Uhlinger Patent 1,520,115; and the temperature of the cooling chamber 3 is preferably automatically thermostatically controlled as described in this Brownlee and Uhlinger patent.

The retort 1 has a steel plate casing 11 and a lining consisting of a facing 12 of fire brick and a backing 13 of refractory insulation material, such as asbestos or the porous insulating material sold under the trade-mark "Silocel". Checkerwork 14 is supported in the retort 1 by supporting columns or upright bricks 15 forming relatively open spaces or chambers 16 beneath the checkerwork. Above the checkerwork is a mixing chamber 17.

A conduit 18 opens into the chamber 16 to supply to the retort 1 a mixture of fuel gas and air. In this way, a heating blast can be discharged into the chambers 16. The top or dome of the retort is provided with an opening or passage 19 which is normally closed by a cap valve 20. A pipe 22 discharges into the top of the retort, and to this pipe are connected two supply pipes one of which, No. 23, supplies the hydrocarbon gas to be decomposed, which is commonly known as the "run gas" in this industry.

The second branch, which is shown as a pipe 24, is connected to a storage tank 25 in which the residual gas resulting from the previous decomposition of a quantity of hydrocarbon gas is confined. The pipe 23 is controlled by a valve 26 and the pipe 24 is controlled by a valve 27. A blower 28 may, if required, be inserted in the pipe 24 to pump gas from the container 25 through the pipe 24 into the retort. Accordingly, "run gas" alone may be supplied through the pipe 22 into the passage 19; or a mixture of "run gas" and residual gas may be supplied to this passage.

A smaller retort 30 is connected to the passage 19 to supply the hot gases of combustion which are to be mixed with the residual gas and the "run gas". The retort 30 has a steel plate casing 31 and a lining consisting of a facing 32 and a backing 33, similarly as in the case of the retort 1. In the retort 30 is a suitable mass of checkerwork 34. Air is blown or otherwise introduced into the retort 30 through a pipe 35 controlled by a valve 36. Fuel is supplied through a pipe 37 controlled by a valve 38, this fuel mixing with the incoming air and burning in the retort 30. A refractory conduit 40 consisting of a facing 41 and a backing 42 of refractory insulation material connects the retort 30 to the opening or passage 19.

My improved process is carried out as follows:—The checkerwork 14 is initially heated by a heating blast through the conduit 18. During this preliminary heating, which occurs when a cold retort is to be brought into operation, the gases of combustion pass up through the checkerwork 14 to initially heat them. The combustion gases are allowed to escape through the opened cap valve 20 in the top of the retort.

After a cold retort has been heated up, it is in condition to operate for the production of carbon black. To do this the retort 30 is operated to supply hot gaseous products of combustion to the passage 19. The proportion of air admitted through the pipe 35 and the fuel gas admitted through the supply pipe 37 may be adjusted by manipulation of the valves in these pipes so that the products of combustion as they emerge from retort 30 are principally or all carbon dioxide, or principally carbon monoxide or a mixture of carbon dioxide and carbon monoxide together, of course, with the nitrogen derived from the air and water vapor from the oxidation of the hydrogen constituent of the hydrocarbon gas. The effect of the different proportions of the carbon dioxide and carbon monoxide is discussed in detail in the Spear application, Serial No. 384,650.

Through the pipe 22 is introduced into the passage 19 a mixture of "run gas" (entering through the pipe 23) and residual gas (entering through the pipe 24). This mixture enters the passage 19 and mixes with the stream of highly heated gases of combustion from the retort 30. The "run gas," which is usually natural gas and which is now mixed both with residual gas and gaseous combustion products from the retort 30, passes down through the checkerwork 14, which has been highly heated by the blast previously applied to it. The volume of residual gas admixed with the "run gas" may be controlled by the valve 27. The characteristics of the resultant carbon black are influenced by the proportion of residual gas which is employed. If a larger proportion of residual gas is used than of combustion products from the retort 30, a carbon black closely resembling the carbon black obtained by the process described in application Serial No. 300,131 is collected in the chamber 7. If too small a proportion of combustion products is used, the cooling of the checkerwork 14 takes place quite rapidly, the yield of carbon black decreasing as the temperature of the checkerwork falls. If, on the other hand, the proportion of combustion products is materially increased, a carbon black is obtained whose characteristics approach those of the carbon black obtained by the process described in the Spear application Serial No. 384,650. I prefer to supply the products of combustion in the ratio of not less than one part combustion products to four parts residual gas, and not in excess of the ratio or four parts of combustion products to one part of the residual gas.

The total volume of diluent gas, that is the residual gas and combustion products combined, is preferably in excess of the hydrocarbon gas, the volumes of the gases being computed of course at the same temperature for purposes of comparison. The volume of the diluent gas is preferably at least twice that of the hydrocarbon gas. Usually, the ratio of volume of diluent gas to hydrocarbon gas is about three or four to one. The volume of diluent gas may be increased above this proportion without materially altering the character of the carbon, but for motives of economy, a volume of diluent gas greater than necessary should not be used. I prefer to use a diluent ratio of not over six volumes of diluent gas to one volume of hydrocarbon gas, nor below about twice that of the hydrocarbon gas.

By the decomposition of the "run gas" in the retort 1, solid carbon particles are formed together with hydrogen gas. The hydrogen is swept along with the stream of gases out of the retort 1. The recoverable carbon is entrained in the gas stream and is recovered in the filtration apparatus.

Due to the fact that the reaction is endothermic, the temperature of the mixture of diluent gases and "run gas" tends to fall, and therefore there is a tendency for the checkerwork 14 to fall in temperature below that at which most efficient operation of the retort may be carried on. Accordingly, it may be found advantageous to discontinue the operation of the retorts 1 and 30 by closing the valves 26, 27, 36 and 38, and a shut-off valve 43 in the outlet 2. Fuel and air are then supplied through the conduit 18 to blast the checkerwork 14 by a hot blast, in the manner described for the heating up of a cold retort. As stated above, in such case, the cap valve 20 is opened and the mixture of fuel and air pass upwardly through the checkerwork 14 and highly heats the same. When the checkerwork 14 has thus been brought to the proper temperature, the introduction of combustible mixture through the conduit 18 is discontinued, the cap valve 20 is closed; and the normal flow of "run gas," residual gas and combustion products into the passage 19 and thence through the mixing chamber and through the checkerwork 14 is maintained until such operation of the apparatus must be again interrupted. The residual gas from which the entrained carbon particles are separated in the chamber 7 is discharged through the pipe 44. If a portion of this residual gas is to be used, as for instance, as a fuel or as a cheap source of hydrogen, the valve 45 may be opened to deliver a portion or all of the residual gas to the place where it is to be used. A branch 46 is provided for conducting the residual gas which is not thus used into the container 25.

It will be apparent that by my improved process the advantages of the Spear process for manufacturing carbon black may be in large measure retained, since the hot combustion products supplied from the retort 30 are mixed with the residual gas and the "run gas" to highly heat the same as they enter the retort 1. This provides for efficiency in the production of carbon black, since the period during which flow of the mixture of "run gas" and diluent gas through the retort 1 may be maintained is substantially lengthened. It is obvious not only that the hot blasting of the checkerwork 14 is a waste of time inasmuch as the quantity of carbon black produced by a retort 1 in a twenty-four hour period is reduced; but it is also obvious that the fuel used for hot blasting the checkerwork 14 does not enter into the yield of carbon black. Therefore, my improvement in the process of producing carbon black, which reduces the frequency with which the checkerwork 14 must be hot blasted is a distinct advance in the efficiency with which carbon black may be produced. On the other hand, the use of residual gas for diluting the "run gas" results in the production of a carbon black which approaches in its characteristics the carbon black which is produced by the Spear and Moore process described in application Serial No. 300,131, filed August 16, 1928. It is apparent, therefore, that in accordance with my improved process, the advantages of both the Spear and Moore process and the Spear process are obtained.

While I have described in detail the preferred embodiments of my invention and the preferred manner of performing the same, it is to be understood that the invention is not so limited, but may be otherwise embodied and practiced within the scope of the following claims.

I claim:

1. The process of producing carbon black, which comprises mixing a hydrocarbon gas to be decomposed with a mixture of a diluent gas consisting principally of the gaseous decomposition products obtained from the decomposition of a previously treated quantity of a hydrocarbon gas and a diluent gas consisting principally of the gaseous combustion products obtained from the combustion of fuel, decomposing the mixture at a high temperature to yield solid carbon particles, and separating the carbon particles from the gaseous decomposition products.

2. The process of producing carbon black, which comprises mixing a hydrocarbon gas to be decomposed with at least twice its volume of a mixture of a diluent gas consisting principally of the gaseous decomposition products obtained from the decomposition of a previously treated quantity of a hydrocarbon gas and a diluent gas consisting principally of the gaseous combustion products obtained from the combustion of fuel, decomposing the mixture at a high temperature to yield solid carbon particles, and separating the carbon particles from the gaseous decomposition products.

3. The process of producing carbon black, which comprises mixing a hydrocarbon gas to be decomposed with a mixture of a diluent gas consisting principally of the gaseous decomposition products obtained from the decomposition of a previously treated quantity of a hydrocarbon gas and a diluent gas at a temperature above the decomposition temperature of the hydrocarbon gas consisting principally of nitrogen and carbon dioxide, passing the mixture over extensive hot contact surfaces so as to decompose the hydrocarbon gas and yield solid carbon particles and separating the carbon particles from the gaseous decomposition products.

4. The process of producing carbon black, which comprises mixing a hydrocarbon gas to be decomposed with from two to six times its volume of a mixture of a diluent gas consisting principally of the gaseous decomposition products obtained from the decomposition of a previously treated quantity of a hydrocarbon gas and a diluent gas consisting principally of the gaseous combustion products obtained from the combustion of fuel, decomposing the mixture at a high temperature to yield solid carbon particles, and separating the carbon particles from the gaseous decomposition products.

5. The process of producing carbon black, which comprises mixing a hydrocarbon gas to be decomposed with from two to six times its volume of a mixture of a diluent gas consisting principally of the gaseous decomposition products obtained from the decomposition of a previously treated quantity of a hydrocarbon gas and a diluent gas consisting principally of the gaseous combustion products obtained from the combustion of fuel, the second diluent gas constituting from 20 to 80 percent of the mixture of diluent gases, decomposing the mixture at a high temperature to yield solid carbon particles, and separating the carbon particles from the gaseous decomposition products.

6. The process of producing carbon black, which comprises burning a fuel, mixing the gaseous products of combustion before substantial loss of heat therefrom has occurred with a diluent gas consisting principally of the gaseous decomposition products obtained from the decomposition of a previously treated quantity of a hydrocarbon gas and a hydrocarbon gas to be decomposed, the hydrocarbon gas being at a relatively lower temperature than the products of combustion prior to mixing, passing the hot mixture over extensive hot contact surfaces so as to decompose the hydrocarbon gas and yield solid carbon particles, and separating the carbon particles from the gaseous decomposition products.

7. The process of producing carbon black, which comprises burning a fuel to produce hot combustion gases, mixing the hot combustion gases with hydrocarbon gas to be decomposed and the gaseous decomposition products obtained from the decomposition of a previously treated quantity of a hydrocarbon gas, further heating the mixture so as to decompose the hydrocarbon gas and yield solid carbon particles and separating the carbon particles from the gaseous decomposition products.

8. The process of producing carbon black, which comprises mixing a hydrocarbon gas to be decomposed with at least twice its volume of a diluent gas consisting principally of a mixture of the gaseous decomposition products obtained from the decomposition of a previously treated quantity of hydrocarbon gas and the gaseous combustion products obtained from the combustion of fuel, passing the mixture over extensive hot contact surfaces so as to decompose the hydrocarbon gas and yield solid carbon particles, and separating the carbon particles from the gaseous decomposition products.

9. The process of producing carbon black, which comprises mixing a hydrocarbon gas to be decomposed with at least twice its volume of a diluent gas consisting principally of a mixture of the gaseous decomposition products obtained from the decomposition of a previously treated quantity of hydrocarbon gas and the gaseous combustion products obtained from the combustion of fuel, passing the mixture over extensive hot contact surfaces so as to decompose the hydrocarbon gas and yield solid carbon particles, separating the carbon particles from the gaseous decomposition products, and hot blasting the contact surfaces from time to time to restore high temperature of the same.

In testimony whereof I have hereunto set my hand.

CARROLL MILLER.